United States Patent
Higashi et al.

(10) Patent No.: US 9,174,316 B2
(45) Date of Patent: Nov. 3, 2015

(54) METHOD OF MANUFACTURING ROLLER

(75) Inventors: Kohei Higashi, Iwata (JP); Satoshi Sugitatsu, Iwata (JP)

(73) Assignee: NTN CORPORATION, Osaka (JP)

( * ) Notice: Subject to any disclaimer, the term of this patent is extended or adjusted under 35 U.S.C. 154(b) by 512 days.

(21) Appl. No.: 13/521,775

(22) PCT Filed: Jan. 21, 2011

(86) PCT No.: PCT/JP2011/051055
§ 371 (c)(1),
(2), (4) Date: Jul. 12, 2012

(87) PCT Pub. No.: WO2011/093215
PCT Pub. Date: Aug. 4, 2011

(65) Prior Publication Data
US 2012/0285018 A1 Nov. 15, 2012

(30) Foreign Application Priority Data
Jan. 26, 2010 (JP) .................................. 2010-014334

(51) Int. Cl.
| B21K 1/02 | (2006.01) |
| B23P 17/00 | (2006.01) |
| B23P 13/02 | (2006.01) |
| B23P 23/02 | (2006.01) |
| B24B 7/16 | (2006.01) |
| B23P 15/00 | (2006.01) |

(52) U.S. Cl.
CPC .............. *B23P 13/02* (2013.01); *B23P 15/003* (2013.01); *B23P 23/02* (2013.01); *B24B 7/16* (2013.01); *Y10T 29/49544* (2015.01)

(58) Field of Classification Search
USPC ............ 29/895, 895.3, 895.33; 175/327, 338; 279/106, 123; 451/5, 11, 42, 242; 700/19, 114, 245, 248
See application file for complete search history.

(56) References Cited

U.S. PATENT DOCUMENTS

| 4,838,562 A | 6/1989 | Akashi |
| 7,455,569 B2 * | 11/2008 | Schafer et al. .................. 451/11 |
| 2005/0233683 A1 | 10/2005 | Kamamura et al. |

FOREIGN PATENT DOCUMENTS

| EP | 2 309 143 | 4/2011 |
| JP | 63-229208 | 9/1988 |
| JP | 63-251158 | 10/1988 |
| JP | 2004-060860 | 2/2004 |
| JP | 2005-297181 | 10/2005 |
| WO | 2010/001706 | 7/2010 |

OTHER PUBLICATIONS

International Search Report issued Mar. 8, 2011 in International (PCT) Application No. PCT/JP2011/051055.
English translation of the Written Opinion of the International Searching Authority issued Mar. 8, 2011 in PCT/JP2011/051055.

* cited by examiner

*Primary Examiner* — Richard Chang
(74) *Attorney, Agent, or Firm* — Wenderoth, Lind & Ponack, L.L.P.

(57) ABSTRACT

A workpiece is fixed by a retracting mechanical chuck mounted on a spindle head of a five-axis control machining center. The apparent outer diameter of the workpiece is increased by a jig. Clamp surfaces of the jaws and a support surface of the jig are formed on the machining center. A cutting tool is mounted on a spindle by an automatic tool exchanger. The workpiece is rotated about an axis to grind an end surface of the workpiece to approximately a predetermined target shape, which is a spherical surface. A grinder is then mounted on the spindle by the automatic tool exchanger, and the grinder is set relative to the workpiece by five-axis control such that the inclination angle, the offset amount, etc. satisfy a predetermined relationship according to the desired grinding. The grinder is then fed in the Z-axis direction to form the spherical surface by grinding.

14 Claims, 8 Drawing Sheets

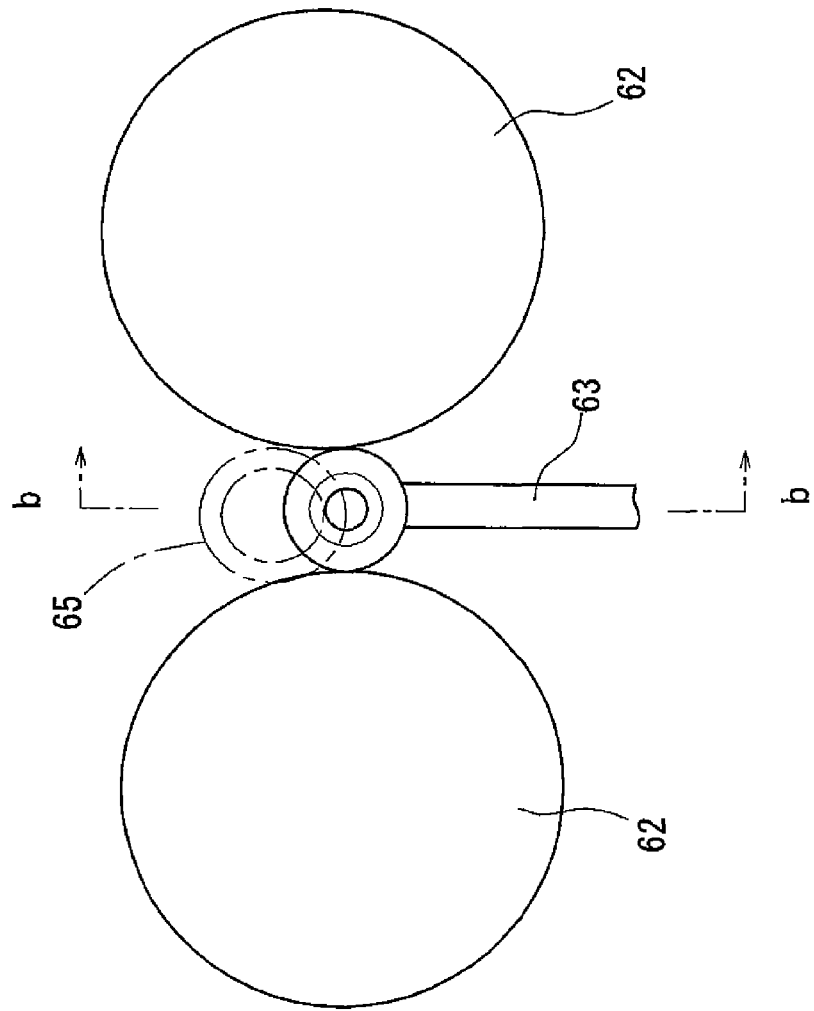
Fig. 6(a) - PRIOR ART
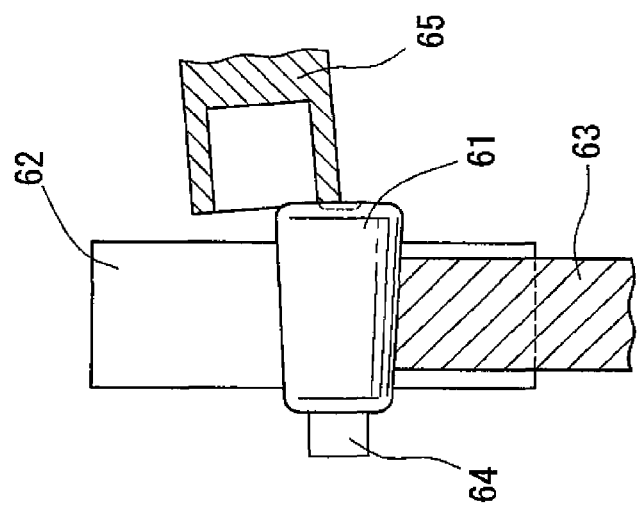
Fig. 6(b) - PRIOR ART

Fig. 7(a) - PRIOR ART
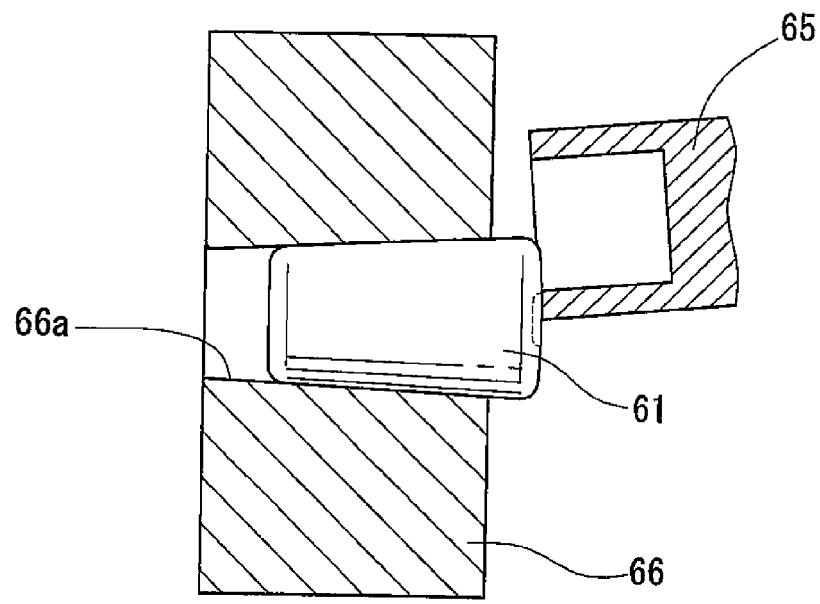
Fig. 7(b) - PRIOR ART
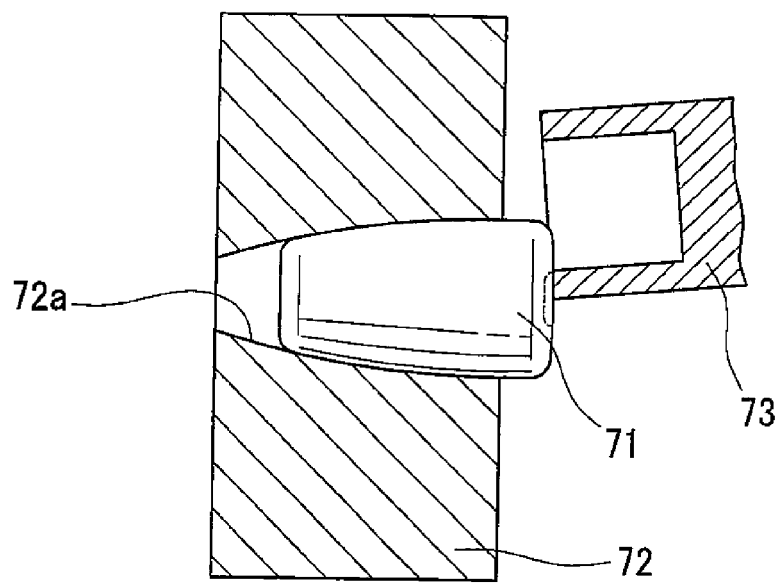

Fig. 8(a) - PRIOR ART
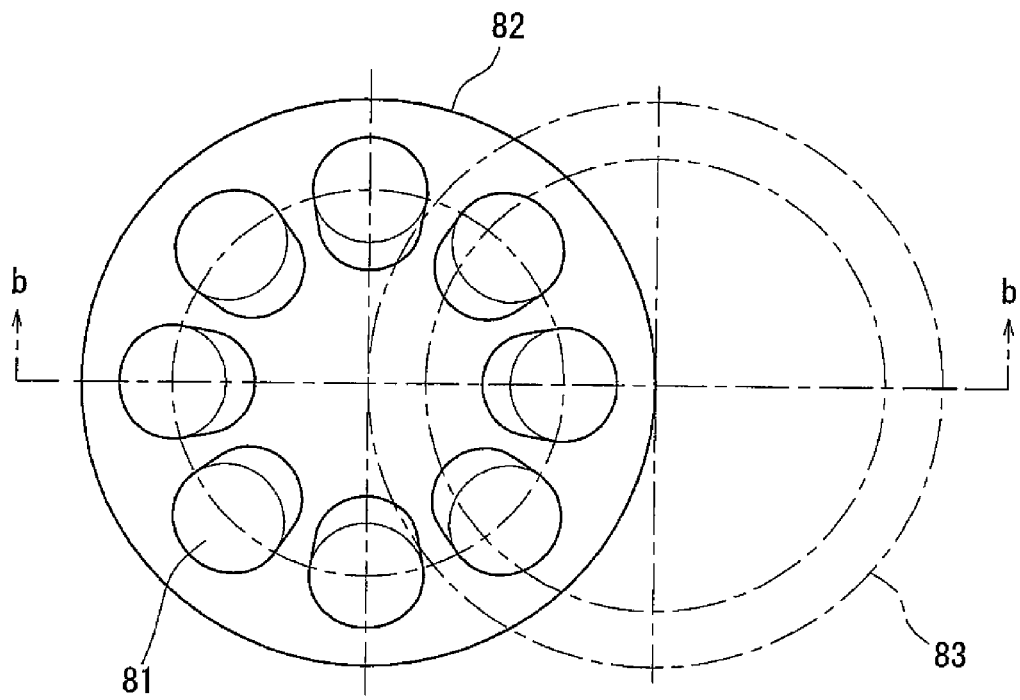
Fig. 8(b) - PRIOR ART
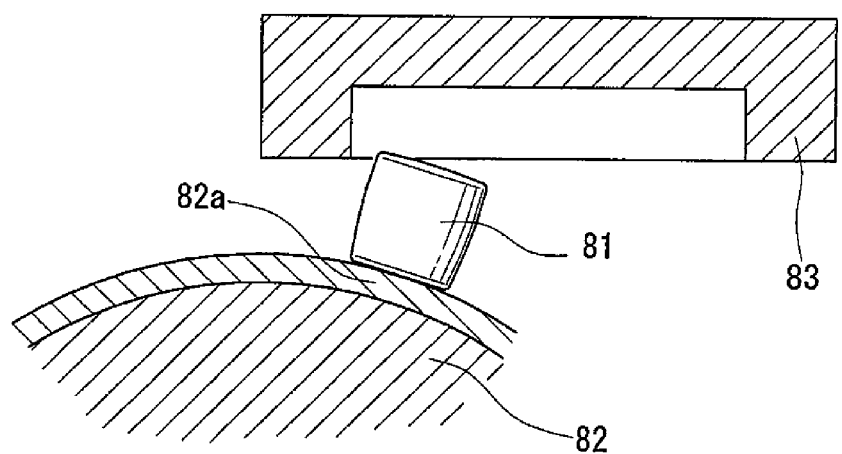

METHOD OF MANUFACTURING ROLLER

TECHNICAL FIELD

This invention relates to a method of manufacturing a roller and particularly a method of forming an end surface of such a roller by grinding.

BACKGROUND ART

The shape of an end surface of a roller affects friction heat due to contact with a flange and edge loads near a chamfer of the roller. Thus, a portion of the roller end surface that affects such factors is ground to ensure necessary dimensional accuracy. For example, in order to reduce friction heat, the spherical portion of the roller end surface that is continuous with the chamfer is formed by grinding. A cup-shaped grinder having a cylindrical grinding portion is typically used for such grinding (JP Patent Publication 2005-297181 (see especially paragraphs 0002-0004, 0016-0018, and 0023, and FIGS. 3 and 4)).

FIGS. 6(a) and 6(b) show a conventional grinding method using a cup-shaped grinder, which is called a two-roll, one-shoe method. In this method, a workpiece 61 formed with a radially outer surface of a roller is held in a lateral position by two roll type driving rings 62, a shoe 63, and a packing plate 64 and rotated about its center axis. Simultaneously, a grinder 65 is cut into an end surface of the workpiece 61. When the grinder 65 is pressed against the end surface, the grinder 65 is inclined relative to the center axis of the workpiece 61 so that a spherical surface can be formed utilizing the self-sharpening characteristics of the grinder 65.

When grinding the workpiece by pressing the cup-shaped grinder while rotating the workpiece about its center axis in the above manner, as shown in FIGS. 7(a) and 7(b), the workpiece 61 or 71 may be inserted into a support surface 66a or 72a of a jig 66 or 72 in a lateral position, and the grinder 65 or 73 may be pressed against the workpiece while rotating the jig 66, 72 coaxially with and together with the workpiece 61, 71. Since the radially outer surface of the workpiece 61, 71 is supported by the support surface 66a, 72a of the jig 66, 72, the jig serves to increase the apparent outer diameter of the workpiece 61, 71, thus increasing positioning accuracy in the direction perpendicular to the center axis of the workpiece 61, 71. The radially outer surface of the workpiece 61, 71 is finished to a rolling surface of one of a tapered roller, a convex roller and a cylindrical roller. Since the radially outer surface of the workpiece 61, 71 is used as a reference surface when positioning the workpiece for grinding, it has to be finished to sufficient accuracy.

In another conventional method shown in FIGS. 8(a) and 8(b), an end surface of a workpiece 81 that is not machined is magnetically fixed to a spherical attracting surface 82a of an electromagnetic turntable 82. A grinder 83 which rotates about an axis parallel to the rotation axis of the electromagnetic turntable 82 is held in a fixed position. The grinder 83 is pressed against the workpiece 81 based on predetermined feed control, while revolving the workpiece 81 around the axis of the turntable 82 with the turntable.

In the conventional arrangement of FIGS. 6(a) and 6(b), if the angle of the radially outer surface of the workpiece 61 for a tapered roller is large, force acts on the workpiece 61 that tends to push out the workpiece 61, which makes it difficult to stably achieve sufficient machining accuracy. In the conventional arrangement of FIG. 7(a) too, if the angle of the radially outer surface of the workpiece 61 is large, since the wedge effect relative to the support surface 66a of the jig 66 is scarcely produced, it is difficult to stably achieve sufficient machining accuracy. In the conventional arrangement of FIG. 7(b), since a workpiece 71 for a convex roller is laterally inserted into the support surface 72a of the jig 72, the jig 72 can retain the workpiece 71 only up to its maximum outer diameter portion. Thus, workpieces that can be stably supported by the jig 72 are limited to workpieces having such an asymmetrical radially outer surface that the maximum outer diameter portion is located nearer to the ground portion as shown in FIG. 7(b). The conventional arrangement shown in FIG. 7(b) cannot be used for workpieces for any convex rollers.

In the conventional arrangement shown in FIGS. 8(a) and 8(b), since the workpiece 81 is fixed in position simply by magnetically attracting its end surface which is not ground to the electromagnetic turntable 82, it is difficult to uniformly retain the attitude of the workpieces 81. This deteriorates machining accuracy. Since the workpiece 81 is magnetized, it is necessary to demagnetize the workpiece after grinding. Further in the conventional arrangement shown in FIGS. 8(a) and 8(b), since the accuracy of the surface finished by grinding depends on the accuracy of the sphere of spherical attracting surface 82a of the electromagnetic turntable 82, a long time is needed when exchanging the electromagnetic turntable 82 for setup change, or when re-polishing the electromagnetic turntable 82 for quality adjustment. Productivity is thus extremely low.

One way to improve productivity of the grinding operation would be to replace the grinding operation with a cutting operation. Ordinarily, tapered rollers and convex rollers are formed by hardening steel, typically bearing steel. In the retaining methods of FIGS. 6(a)-8(b), it is difficult to achieve retaining force sufficient to allow cutting of a workpiece made of hardened steel.

SUMMARY OF THE INVENTION

An object of the present invention is to improve the efficiency of grinding of a roller end surface of a workpiece for a tapered roller or a convex roller, and to expand the types of workpieces of which end surfaces can be ground to sufficient accuracy.

In order to achieve this object, this invention provides a method of manufacturing a roller including the steps of positioning a workpiece formed with a radially outer surface of a tapered roller or a convex roller, and forming an end surface of the roller having a predetermined target shape by grinding, wherein the method comprises preparing a five-axis control machining center comprising a spindle carrying a cutting tool and a grinder, and a spindle head carrying a mechanical chuck having jaws, fixing the workpiece in position with the jaws of the mechanical chuck, cutting the end surface to a finished cut surface approximate in shape to the predetermined target shape with the cutting tool, and grinding the thus cut end surface to the predetermined target shape with the grinder.

Since a five-axis control machining center can perform complicated three-dimensional cutting, it can cut a workpiece to a shape approximate to a predetermined target ground shape. A mechanical chuck for a five-axis control machining center, which can perform various cutting operations, can fix a workpiece in position which is made of hardened steel during cutting. By replacing part of a conventional operation of a workpiece, it is possible to later grind the workpiece to a target shape with high accuracy. This improves efficiency in grinding compared to conventional arrangements. The jaws of such a mechanical chuck can grip any portion of the radially outer surface of a workpiece for a tapered roller or a convex roller within a range of the center axis direction, irrespective of the cone angle or the position of the maximum outer diameter portion, and fix it in position. Thus, compared to conventional arrangements, in which the types of workpieces that can be machined are limited according to their cone angles or the positions of the maximum outer diameter portions, a wider variety of workpieces can be ground to sufficient accuracy.

For example, if the predetermined target ground shape is a spherical shape, the finished cut surface is a spherical surface, wherein the grinder is a cup-shaped grinder having a cylindrical grinding portion, which is also used in conventional arrangements, the five-axis control machining center having a center of the sphere containing the predetermined target shape, a Z-axis about which the grinder is rotated, and a first rotation axis about which the workpiece is rotated, and wherein the machining center is configured to grind the end surface by contouring control so as to satisfy, when considered on a plane perpendicular to a second rotation axis about which one of the spindle head and the spindle is inclined relative to an XZ plane or a YZ plane:

condition (i): The workpiece is rotated with an apex of the predetermined target shape located on a line passing the center of the sphere and the second rotation axis, while being inclined at an inclination angle α;

condition (ii): The second rotation axis is offset from the Z-axis in the direction of an X-axis which intersects the Z-axis at a right angle by an offset amount e;

condition (iii): The workpiece and the grinder are positioned so as to satisfy the following Equations 1 and 2:

$$R=\{(D/2)+e\}/\sin(\alpha) \qquad \text{Equation 1}$$

$$e=(D/2)-H\sin(\alpha) \qquad \text{Equation 2}$$

where R is the radius of the spherical surface; D is the outer diameter of the grinder; and H is the distance between the second rotation axis and the apex; and condition (iv): With the workpiece and the grinder positioned so as to satisfy the conditions (i) to (iii), the workpiece is rotated about a first axis, and the grinder is rotated about the Z-axis and simultaneously fed in the direction of the Z-axis toward the workpiece, thereby forming the predetermined target shape. With this arrangement, it is possible to reduce the amount of material removed by grinding since the workpiece is cut to a shape approximate to the target shape before grinding.

By using a retracting chuck as the mechanical chuck, it is possible to prevent floating of the workpiece gripped by the jaws because the jaws are being pulled.

The workpiece may be fitted in a support surface of a jig fixed to the spindle head, and an end portion of the workpiece protruding from the support surface and not adapted to be ground may be gripped by the jaws. With this arrangement, it is possible to prevent floating of the radially outer surface of the workpiece from the support surface since the mechanical chuck is being pulled. This reliably prevents floating of the workpiece due to the cone angle or curvature of the radially outer surface of the workpiece while the workpiece is being rotated by the spindle head.

Preferably, the support surface of the jig is formed by the five-axis control machining center with the jig mounted on the machining center. With this arrangement, since the center axis of the support surface of the jig is determined based on the five axes, the centering accuracy is kept high.

Preferably, an area of the radially outer surface of the workpiece extending from its maximum diameter portion toward the ground portion is gripped by the jaws. With this arrangement, compared to conventional two-roll, one-shoe, or jig type grinding arrangements, in which a workpiece for a convex roller can be inserted only up to its maximum outer diameter portion, the radially outer surface of the workpiece can be positioned at a portion nearer to the ground portion from the maximum outer diameter portion of the workpiece. The workpiece can thus be more easily stabilized during cutting and grinding.

The workpiece may be formed with a center hole in the end surface of the workpiece that is not ground, and the spindle head may have a fixing center configured to be fitted in the center hole, thereby fixing the workpiece in position with the jaws and the fixing center. With this arrangement, the workpiece can be stabilized without the need to grip the non-ground side of the radially outer surface of the workpiece.

Clamp surfaces are preferably formed on the jaws so as to coincide with the radially outer surface of the workpiece on the five-axis control machining center. With this arrangement, since the center of the mechanical chuck is determined based on the five axes, centering is unnecessary. Thus, centering accuracy is high compared to the arrangement in which general purpose jaws are used.

Another grinding portion of the workpiece may be ground by the five-axis control machining center with the workpiece fixed to the spindle head. The five-axis control machining center makes it possible to machine the workpiece with various tools, which are exchangeable using an automatic tool exchanger, without the need to dismount the workpiece. This improves productivity of rollers having other portions that have to be ground.

The five-axis control machining center can perform various kinds of cutting operations. Among such cutting operations, turning is preferable because it is simple. Specifically, the finished cut surface can be formed by turning the workpiece with the cutting tool while rotating the spindle head.

The mechanical chuck and the jib may be configured such that they can clamp a workpiece made of hardened steel with a clamp force sufficient to cut the workpiece to sufficient accuracy. Thus, the present invention is suitable for cutting and grinding a workpiece made of hardened steel.

According to the present invention, with a workpiece for a tapered roller or a convex roller fixed to the spindle head of the five-axis control machining center by means of a mechanical chuck, the roller end surface of the workpiece is cut to a shape approximate to the predetermined target shape, and then the thus formed finished cut surface is ground, by the five-axis control machining center. Thus, it is possible to grind the roller end surface of the workpiece with high efficiency and to sufficient accuracy, and it is also possible to grind a greater variety of workpieces to sufficient accuracy.

BRIEF DESCRIPTION OF THE DRAWINGS

FIG. 1(*b*) schematically shows a grinding operation according to the first embodiment.

FIG. 3(*b*) is a sectional view taken along line b-b of FIG. 3(*a*).

FIG. 6(a) schematically shows a conventional two-roll, one-shoe grinding operation; and FIG. 6(b) is a partial enlarged sectional view taken along line b-b of FIG. 6(a).

FIG. 7(a) is a sectional view taken along line b-b of FIG. 6(a) with a grinder pressed against a workpiece for a tapered roller inserted in a jig; and FIG. 7(b) is a sectional view taken along line b-b of FIG. 6(a) with the grinder pressed against a workpiece for a convex roller inserted in the jig.

FIG. 8(a) schematically shows a conventional grinding operation using an electromagnetic turntable; and FIG. 8(b) is a partial enlarged sectional view taken along line b-b of FIG. 8(a).

DETAILED DESCRIPTION OF THE INVENTION

The first embodiment of the present invention is described with reference to the drawings, and is a method of manufacturing a roller including the steps of positioning a workpiece formed with a radially outer surface of a tapered roller, and forming end surfaces on the workpiece by grinding.

Figure 2:
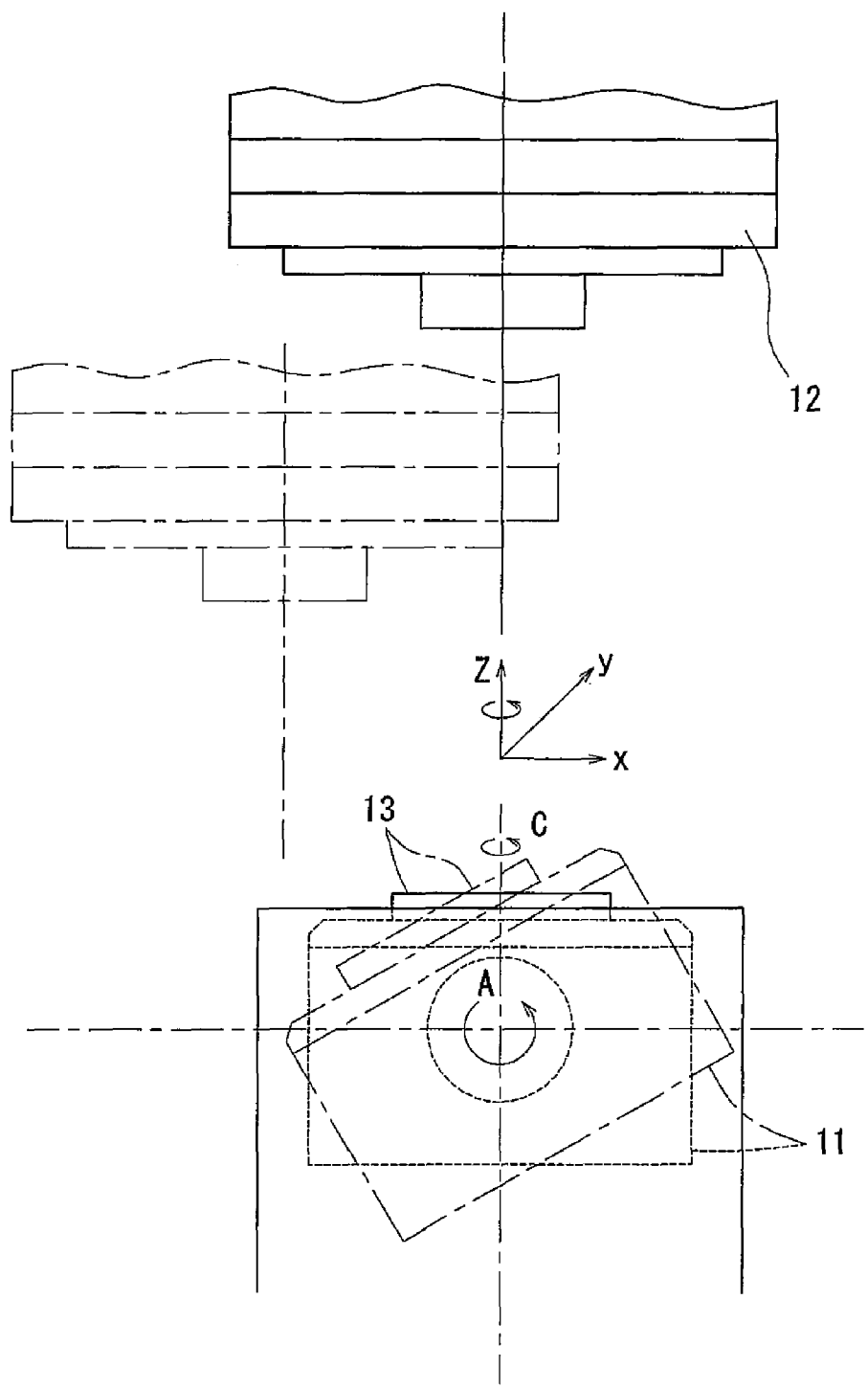
FIG. 2 schematically shows five axes of a five-axis control machining center used in the first embodiment.

As shown in FIG. 2, the five-axis control machining center used in this invention includes a spindle head 11 for fixing a workpiece, not shown, a spindle 12 carrying a tool, not shown, and an automatic tool exchanger, not shown either, and has five axes comprising a Z-axis about which the tool is rotated by the spindle 12, X- and Y-axes that interest each other and the Z-axis at right angles, a first rotation axis (axis C in the figures; which is the axis of a chuck) about which the workpiece is rotated by the spindle head 11, and a second rotation axis (axis A in the figures) about which the spindle head 11 or the spindle 12 is inclined relative to the XZ plane, i.e. the plane including the X- and Z-axes, or the YZ plane, i.e. the plane including the Y- and Z-axes, whereby this machining center can perform simultaneous 5-axis contouring control. Contouring control is a numerical control movement of two or more axes according to orders defining the next necessary position and feed speeds necessary to reach this position (necessary contour is formed by varying the feed speeds relative to one another).

The five-axis control machining center shown is of an upright type of which the spindle head 11 has the first and second rotation axes. The Z-axis of this machining center extends in the vertical direction. Rotation about the second rotation axis or axis C is the rotation relative to the YZ plane. Rotation about the first axis or axis A is the rotation relative to the XY plane.

Figure 3A:
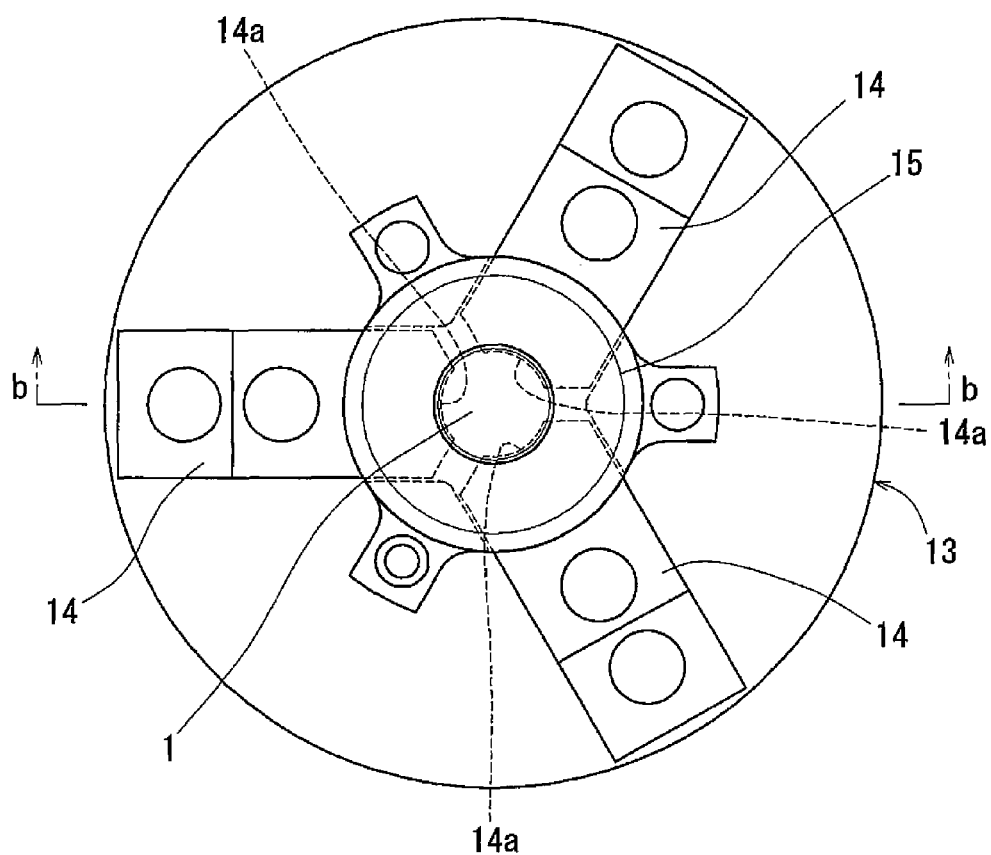
FIG. 3(*a*) is a plan view of a mechanical chuck and a jig mounted on a spindle head of FIG. 2.
Figure 3B:
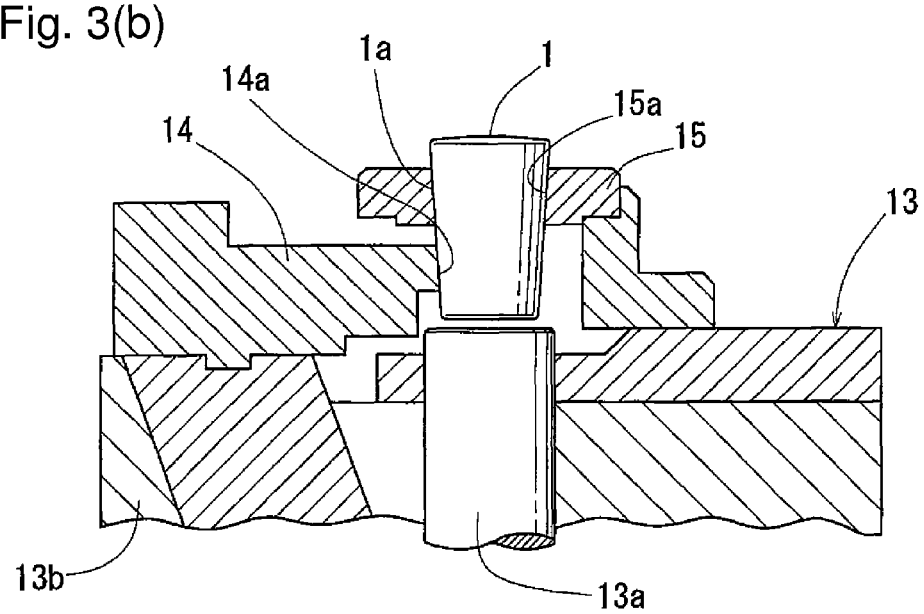

The spindle head 11 carries a mechanical chuck 13. As shown in FIGS. 3(a) and 3(b), the mechanical chuck 13 has jaws 14 for fixing the workpiece 1 in position by gripping its radially outer surface 1a. The axis of the chuck coincides with axis C.

The radially outer surface 1a of the workpiece 1 has a rolling surface portion of a tapered roller. The jaws 14 each have a clamp surface 14a for gripping the rolling surface portion of the radially outer surface 1a. The rolling surface portion of the radially outer surface 1a is finished to such high accuracy that the rolling surface portion can be used as a reference surface when fixing the workpiece 1 in position with the mechanical chuck 13. The center axis of the radially outer surface 1a of the workpiece 1 coincides with the axis of the chuck, the center axis of the workpiece 1 and the center axis of the roller.

The mechanical chuck 13 is a retracting chuck. This chuck includes a mechanism for simultaneously radially inwardly moving the jaws 14 toward the center axis of the chuck when the chuck is retracted toward the stopper 13a. After the jaws 14 are moved radially inwardly until they abut the rolling surface portion of the radially outer surface 1a of the workpiece 1, the chuck is further retracted to fix the workpiece 1 in position, preventing floating of the workpiece 1. The retracting chuck may include a retractable drawbar which is adapted to move the jaws 14 along a conical surface of a chuck body 13b of the mechanical chuck 13 toward the center axis of the chuck when the drawbar is retracted.

The spindle head 11, which is shown in FIGS. 3(a) and 3(b), includes a jig 15 which serves to increase the apparent outer diameter of the workpiece 1. The jig 15 is mounted on the chuck body 13b of the mechanical chuck 13 and thus fixed to the spindle head 11, as shown in FIG. 2. As shown in FIG. 3(b), the jig 15 has a bearing surface 15a on its inner periphery which receives the workpiece 1 in the direction perpendicular to the center axis of the workpiece 1, and in the direction in which the tool is pressed against the workpiece 1 in the direction of the Z-axis. The center axis of the workpiece 1 coincides with the center axis of the bearing surface 15a. The end surface of the workpiece 1 to be machined corresponds to the large-diameter end surface of the roller.

As shown in FIGS. 3(a) and 3(b), the workpiece 1 is fitted in the bearing surface 15a of the jig 15, and the end portion of the workpiece 1 which protrudes from the bearing surface 15a and includes the end surface that is not to be machined is gripped by the mechanical chuck 13. In this state, both ends of the workpiece 1 are positioned in the direction perpendicular to the center axis of the chuck by the jaws 14 and the bearing surface 15a. By further retracting the chuck after the jaws 14 abut the workpiece 1, it is possible to prevent floating of the workpiece 1.

With the workpiece 1 fixed in position in this manner, a gap exists between the end surface of the workpiece 1 which is not to be machined and the stopper 13a of the mechanical chuck 13. This means that the workpiece 1 is not supported by the stopper 13a. The workpiece 1 is not supported by the stopper because the rolling surface portion of the radially outer surface 1a of the workpiece 1 is fixed in position toward the center axis of the chuck by the bearing surface 15a of the jig 15, and because it is difficult to accurately form the respective portions if the workpiece 1 is supported both by the bearing surface 15a and the stopper 13a.

The clamp surfaces 14a of the jaws 14 are formed by the five-axis control machining center. Specifically, a mechanical chuck 13 is assembled using jaw workpieces having portions to be formed into the clamp surfaces 14a, and with the thus assembled mechanical chuck 13 fixed to the spindle head 11, the clamp surfaces 14a are formed by boring using a tool mounted to the spindle 12 so as to be complementary in shape to the rolling surface portion of the radially outer surface 1a of the workpiece 1. Boring may be carried out with a dummy gripped by the jaw workpieces. With this arrangement, it is possible to determine the center axis of the mechanical chuck 13 based on the five axes of the machining center. This eliminates the necessity of centering and makes it possible to fix the workpiece 1 in position with high accuracy and without the possibility of run-out. After forming the clamp surfaces 14a with the chuck mounted on the machining center, it is not necessary to dismount the jaws 14 or the mechanical chuck 13 until the machining of the workpiece 1 on the five-axis control machining center is finished. This eliminates the possibility of reduced centering accuracy due to mounting errors of the jaws 14 when the clamp surfaces 14a are formed with a separate machine tool.

The bearing surface 15a of the jig 15 is also formed by the five-axis control machining center. Specifically, a jig workpiece having a portion to be formed into the bearing surface 15a is fixed to the spindle head 11, and the bearing surface 15a is formed by boring using a tool mounted on the spindle 12. Since the center axis of the bearing surface 15a is determined based on the five axes of the machining center, centering accuracy is kept high. After forming the clamp surfaces 14a of the jaws 14 with the chuck mounted on the machining center, the jig 15 is mounted on the chuck body 13b to form the bearing surface 15a. By forming the bearing surface 15a with the jig 15 mounted on the chuck 13 after forming the clamp surfaces 14a with the chuck 13 mounted on the machining center, it is not necessary to dismount the jig 15 until the machining of the workpiece 1 on the five-axis control machining center is finished. This eliminates the possibility of reduced centering accuracy due to mounting errors of the jig 15 when the bearing surface 15a is formed with a separate machine tool.

The mechanical chuck 13 and the jig 15 should both be made of a material having strength sufficient to ensure accuracy of cutting and grinding of hardened steel. The materials of the jaws 14 and the jig 15 are not particularly limited, provided that they ensure necessary positioning accuracy of the workpiece 1.

The workpiece 1 is made of hardened steel of which the surface has been hardened to a suitable degree and by suitable means, such as high- or medium-carbon alloy steel (steel formed by immersion hardening), case hardened steel (carburized steel) or induction hardened steel. Since the mechanical chuck 13 and the jig 15 are non-magnetic workpiece holders, they never magnetize the workpiece 1, which is made of steel.

After fixing the workpiece 1 to the spindle head 11 by means of the jig 15 and the mechanical chuck 13, the end surface of the workpiece 1 to be machined, which protrudes from the jig 15, is ground to a predetermined target shape. The predetermined target shape is a spherical shape. In the example shown, the entire end surface of the roller is spherical. But as disclosed in JP Patent Publication 2005-297181, a recess may be formed at the center of the end face of the workpiece 1 beforehand.

Figure 1A:
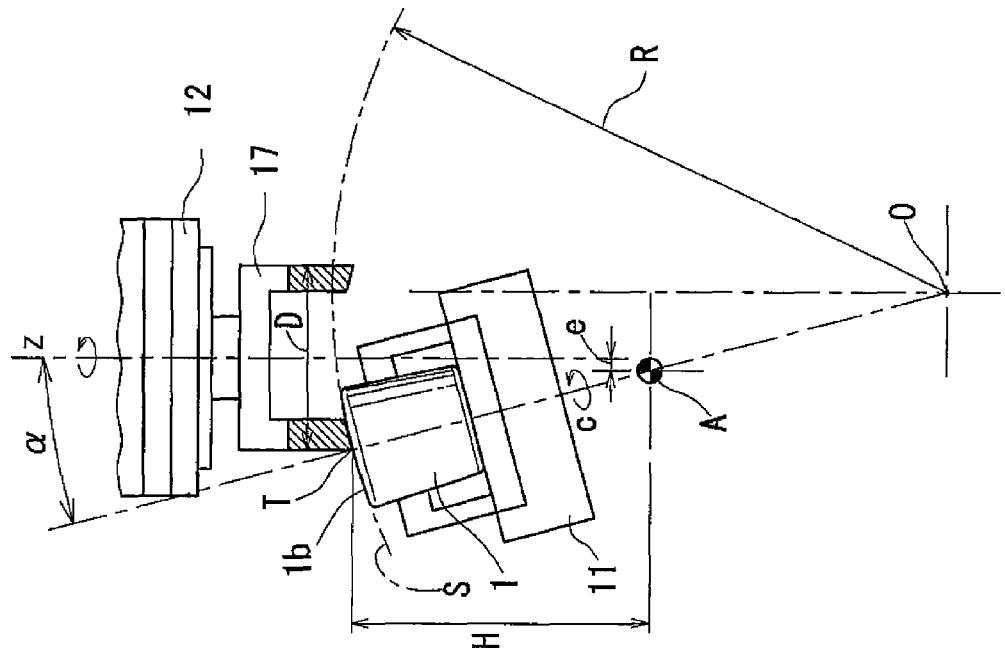
FIG. 1(*a*) schematically shows a cutting operation according to a first embodiment of the present invention.
Figure 1B:
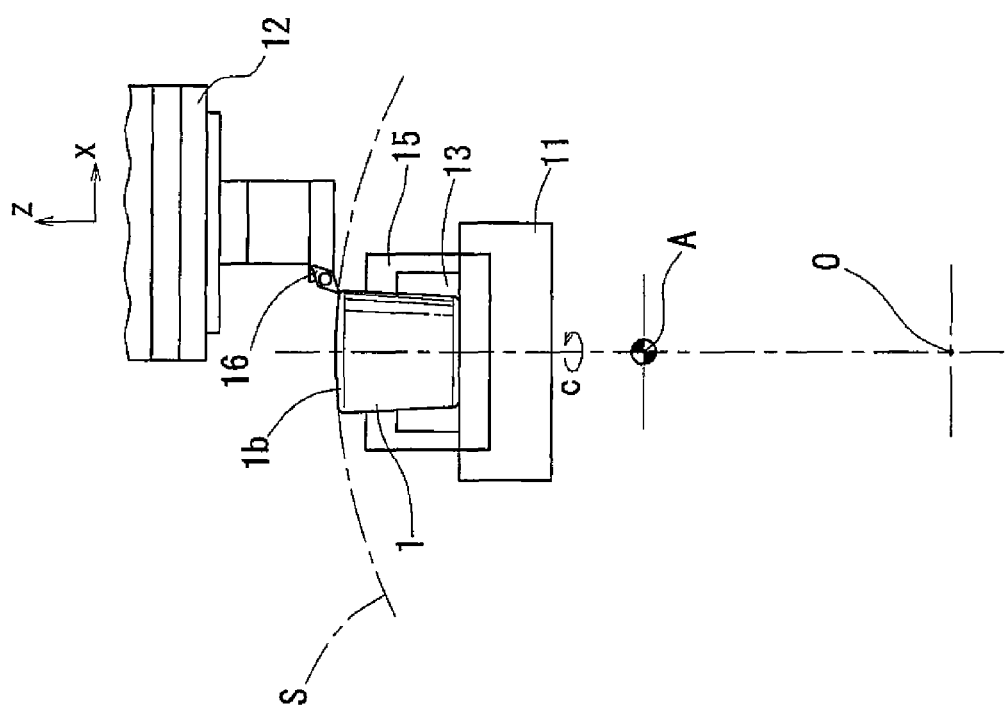

Before machining the workpiece, information necessary to form an end surface having the predetermined target shape is entered into the five-axis control machining center. Then as shown in FIG. 1(a), the workpiece 1 is cut by a cutting tool 16 mounted on the spindle 1 into a shape approximate to the predetermined target shape. As shown in FIG. 1(b), the surface 1b formed by the cutting tool 16 (which is referred to as the "finished cut surface 1b") is then ground by a grinder 17, now mounted on the spindle 12. FIGS. 1(a) and 1(b) are on a plane perpendicular to axis A, and show the Z-axis, about which the grinder 17 is rotated by the spindle 12, and axis C, about which the workpiece 1 is rotated by the spindle head 11.

Figure 4:
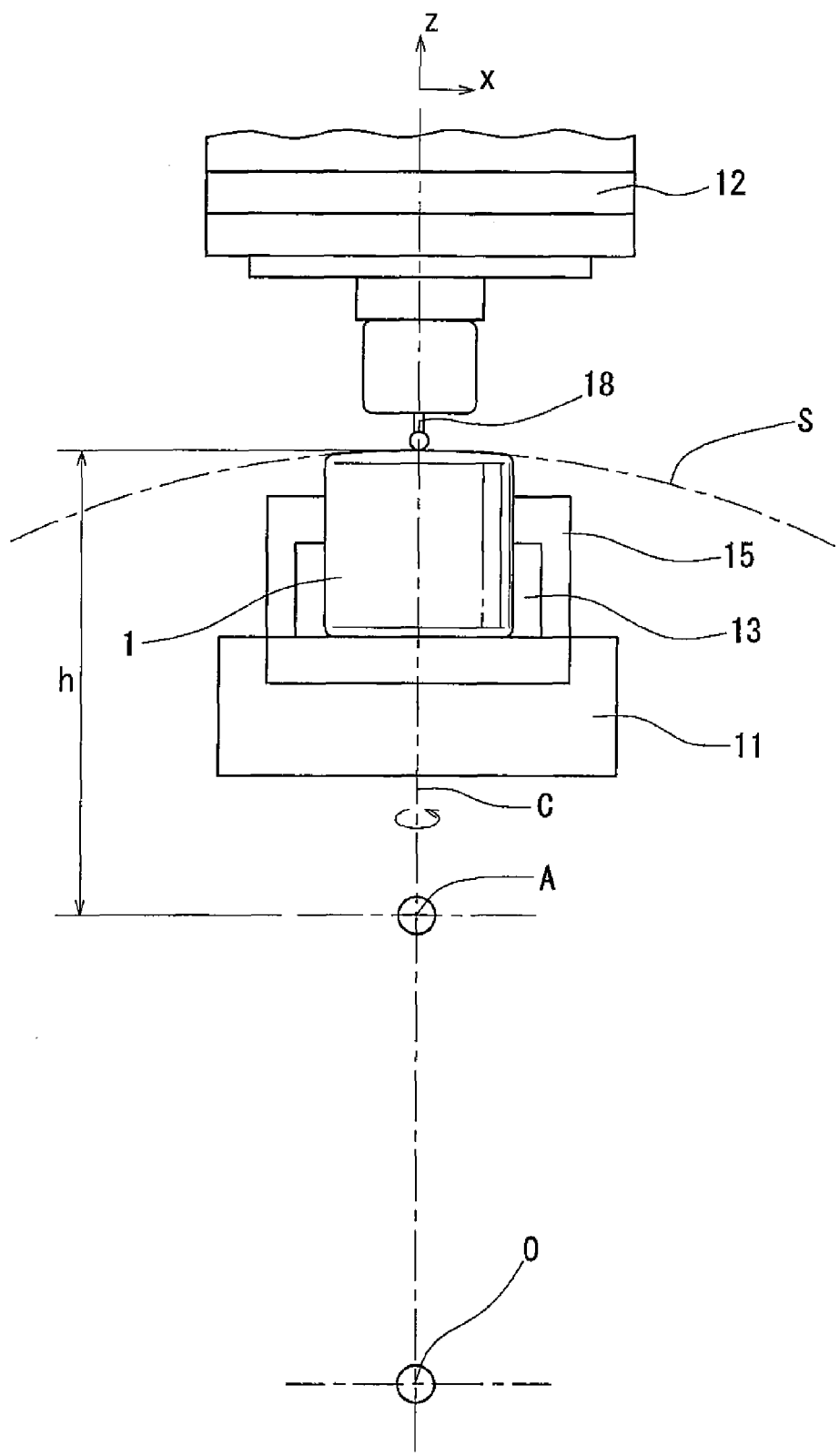
FIG. 4 schematically shows how measurement is made by a built-in measuring device mounted in the five-axis control machining center of FIG. 2.

Before machining the workpiece 1, as shown in FIG. 4, the height h of the top surface of the workpiece 1 is measured with a built-in measuring device 18 mounted in the five-axis control machining center. The five-axis control machining center renews the Z coordinate so that the workpiece is cut as defined by the information entered, and calculates, from the measured coordinate value, the inclination angle a and the offset e (see FIGS. 1(a) and 1(b)) necessary to form the spherical surface S, as expressed by the below equations 1 and 2. The spherical surface S is the above-described predetermined target shape formed by grinding. FIG. 4 shows the same plane as FIGS. 1(a) and 1(b).

The height h of the top surface of the workpiece 1 is the height from axis A in the direction of the Z-axis. The end of the workpiece 1 to be machined has a shape analogous to the spherical surface S. Thus, the height h is measured on the center axis of the workpiece 1 (which coincides with axis C) of the top surface of the workpiece.

After renewing the Z coordinate, the five-axis control machining center performs two-axis (X-axis and Z-axis) contouring control based on the calculated coordinate, i.e. cuts the end of the workpiece 1 to be machined with the cutting tool 16 for hardened steel by turning the spindle head 11 about axis C to form the finished cut surface 1b, which is a spherical surface along the spherical surface S. The finished cut surface 1b can be further ground to the spherical surface S. The finished cut surface 1b is finished to the predetermined dimension, shape and surface roughness by grinding. Since the amount of material removed by grinding is very small compared to the size of the workpiece 1, it is not shown. The cutting of the workpiece 1 may be finish cutting, rough cutting or medium cutting.

After cutting, the grinder 17 is mounted on the spindle 12 using the automatic tool exchanger, and the five-axis control machining center grinds the finished cut surface 1b with the grinder 17. The grinder 17 is a cup-shaped grinder having a cylindrical grinding portion. By the five-axis contouring control, spherical grinding corresponding to conventional spherical grinding using a cup-shaped grinder is carried out. Specifically, the five-axis control machining center performs five-axis contouring control so as to satisfy the below conditions (i) to (iv) on the plane containing the figures to grind the finished cut surface 1b.

(i) The workpiece 1 is rotated with the apex T of the spherical surface S located on a line passing the center O of the spherical surface S and axis A while being inclined at an angle a relative to the Z-axis. The apex T is on the center axis of the workpiece.

(ii) Axis A is offset from the Z-axis in the direction of the X-axis by an offset amount e. Thus, the offset amount e is the difference between the X coordinates of the Z-axis and axis A.

(iii) The workpiece 1 and the grinder 17 are positioned so as to satisfy the following Equations 1 and 2:

$$R = \{(D/1) + e\}/\sin(\alpha) \qquad \text{Equation 1}$$

$$e = (D/2) - H\sin(\alpha) \qquad \text{Equation 2}$$

where R is the radius of the spherical surface; D is the outer diameter of the grinder 17; α is the inclination angle of the center axis of the workpiece 1 relative to the Z-axis; e is the above-mentioned offset amount; and H is the distance between axis A and the apex T.

(iv) With the workpiece 1 and the grinder 17 positioned in this manner, the workpiece 1 is rotated about axis C together with the spindle head 11, and the grinder 17 is rotated about the Z-axis together with the spindle 12. Simultaneously, the grinder 17 is fed in the direction of the Z-axis toward the workpiece 1, thereby forming a large-diameter end surface in the shape of the spherical surface S on the workpiece 1. The feed rate of the grinder 17, pressure of the grinder 17 against the finished cut surface 1b, and other grinding control parameters are determined based on e.g. the shape of the end portion of the workpiece to be machined, the predetermined target shape, and characteristics of the grinder. Grinding of the finished cut surface 1b may be carried out using a plurality of grinders instead of the single grinder to improve accuracy of the surface S. In this case, grinders are exchanged using the automatic tool exchanger.

In the first embodiment, as shown in FIGS. 1(a) and 1(b), the workpiece 1, made of hardened steel, is first roughly cut, and then ground to form the intended spherical large-diameter surface S with high accuracy at one end of the workpiece. Since the workpiece is first roughly cut, the workpiece can be ground with high accuracy.

In the first embodiment, as shown in FIGS. 3(a) and 3(b), a workpiece 1 for a tapered roller can be fixed to the spindle head 11 by gripping its radially outer surface with the jaws 14 of the mechanical chuck 13 within the range of its center axis irrespective of its taper angle. Thus, compared to conventional examples, in which workpieces that can be machined are limited according to their taper angles, it is possible to grind a wider variety of workpieces to sufficient accuracy.

In the first embodiment, other portions of the workpiece 1 fixed to the spindle head as shown in FIGS. 3(a) and 3(b) can also be machined by the five-axis control machining center. For example, by mounting a drilling or milling tool using the automatic tool exchanger of the five-axis control machining center, it is possible to form a hole extending through the roller along its center axis or a recess at the roller end surface, without the need to dismount the workpiece 1 from the spindle head 11. This improves productivity of such rollers. For example, after forming the finished cut surface 1b by turning and before grinding the surface 1b, a grinding recess may be formed by cutting on the end portion of the workpiece 1 to be ground.

Since various machining operations as mentioned above can be performed on the workpiece 1 to sufficient accuracy with the five-axis control machining center, without the need to dismount the workpiece 1 from the spindle head 11, the shape of the roller end surface formed at one end portion of the workpiece 1 is not limited to a spherical shape. For example, such a roller end surface may have a recess such as the above-mentioned grinding recess, a conical surface continuous with the chamfer of the roller, or a crowning continuous with the chamfer of the roller.

If only the end of a workpiece 1 for a roller having standard dimensions is to be machined, there is no lack of freedom of contouring control and the size of the upright spindle head 11 having axis C and axis A. Thus, it is not necessary to use a lateral five-axis control machining center, of which the Z-axis coincides with a horizontal direction, or a swivel type five-axis machining center, of which the spindle has a second rotation axis. If one of such five-axis control machining centers is used, their respective axes are replaced with the corresponding axes of the first embodiment for contouring control.

Figure 5A:
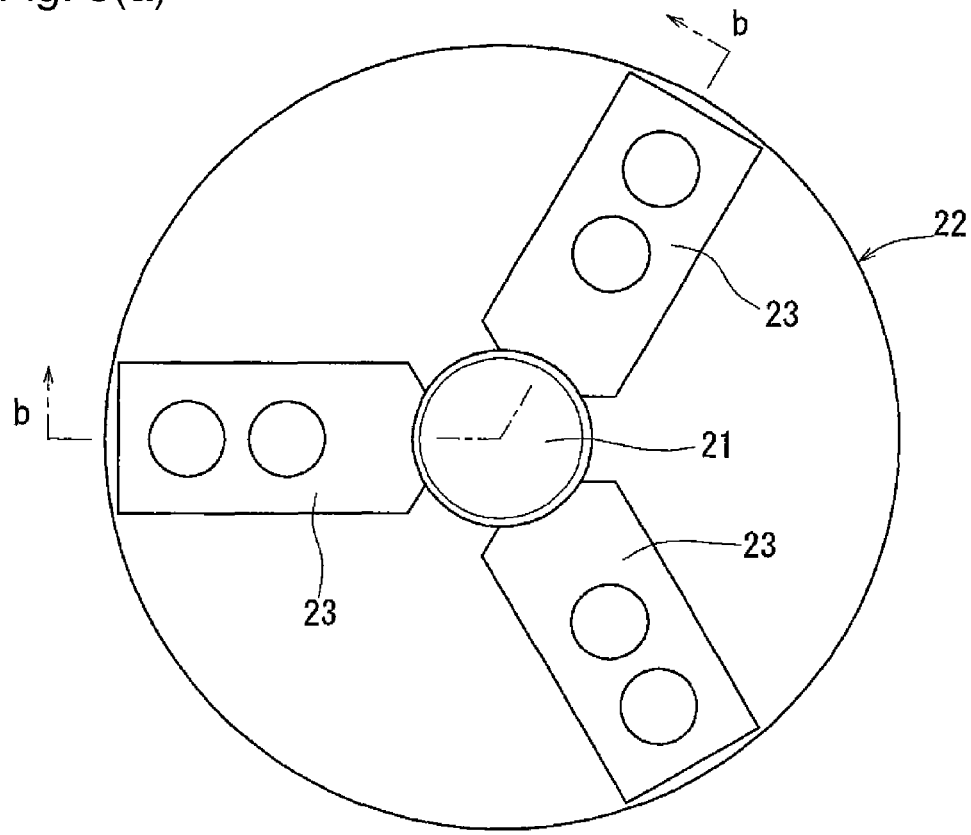
FIG. 5(a) is a plan view of a mechanical chuck used in a second embodiment.
Figure 5B:
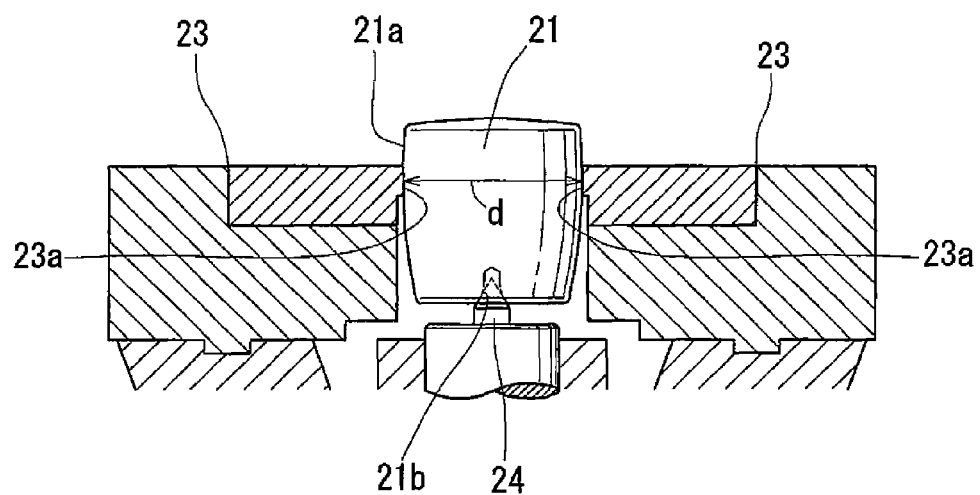
FIG. 5(b) is a sectional view taken along line b-b of FIG. 5(a).

The jig 15 may be omitted, in which case the workpiece is fixed in position by the mechanical chuck only. The second embodiment shown in FIGS. 5(a) and 5(b) is an example of this arrangement. Identical names are used for elements of this embodiment that are considered to correspond to those of the first embodiment, and their description is omitted.

As shown, a workpiece 21 for a convex roller is fixed in position by the mechanical chuck 22 only. A rolling surface shape of an asymmetrical convex roller is formed on the radially outer surface 21a of the workpiece 21. The maximum diameter portion of the workpiece 21 can be gripped by jaws 23. This workpiece 21 can be more stably gripped by the jaws than a workpiece for a tapered roller, which cannot be gripped at the maximum diameter portion. This makes it possible to omit the jig.

The mechanical chuck 22 is configured to grip with the clamp surfaces 23a the portion of the radially outer surface 21a of the workpiece including from the maximum diameter portion d toward the end to be ground. Compared to the conventional two-roll one-shoe or jig type grinding arrangement, in which the workpiece 21 can be inserted up its maximum diameter portion, since the radially outer surface 21a of the workpiece 21 can be positioned at its portion nearer to the end to be ground from the maximum diameter portion, the workpiece 21 can be stably held in position during cutting and grinding. The workpiece 21 shown is one for an asymmetrical convex roller. But a workpiece for a symmetrical convex roller can also be gripped at a portion of the radially outer surface 21a nearer to the end to be ground such that the jaws 23 do not interfere with the machining. Thus, according to the second embodiment, it is possible to grind a wider variety of workpieces for convex rollers to sufficient accuracy.

A center hole 21b is formed in the end surface of the workpiece 21 which is not ground in which fixing center 24 is adapted to be fitted. Since the workpiece 21 is fixed in position by the jaws 23 and the fixing center 24, it is possible to stably hold the workpiece 21 even though the non-machining side of the radially outer surface 21a of the workpiece is not gripped by the jaws 23.

The technical scope of the present invention is not limited to the embodiments, and contains every modification thereof within the technical scope defined by claims.

What is claimed is:

1. A method of manufacturing a roller including the steps of positioning a workpiece formed with a radially outer surface of a tapered roller or a convex roller, and forming an end surface of the roller having a predetermined target shape by grinding, wherein said method comprises preparing a five-axis control machining center comprising a spindle carrying a cutting tool and a grinder, and a spindle head carrying a mechanical chuck having jaws, fixing the workpiece in position with the jaws of the mechanical chuck, cutting said end surface to a finished cut surface approximate in shape to said predetermined target shape with the cutting tool, and grinding the thus cut end surface to said predetermined target shape with the grinder, and wherein the predetermined target shape is a spherical shape, and the finished cut surface is a spherical surface, wherein the grinder is a cup-shaped grinder having a cylindrical grinding portion, said five-axis control machining center having a center of the sphere containing said predetermined target shape, a Z-axis about which the grinder is rotated, and a first rotation axis about which the workpiece is rotated, and wherein the machining center is configured to grind said end surface by contouring control so as to satisfy, when considered on a plane perpendicular to a second rotation axis about which one of the spindle head and the spindle is inclined relative to an XZ plane or a YZ plane:

condition (i): The workpiece is rotated with an apex of said predetermined target shape located on a line passing said center of the sphere and said second rotation axis, while being inclined at an inclination angle $\alpha$;

condition (ii): The second rotation axis is offset from the Z-axis in the direction of an X-axis which intersects the Z-axis at a right angle by an offset amount e;

condition (iii): The workpiece and the grinder are positioned so as to satisfy the following Equations 1 and 2:

$$R = \{(D/2) + e\}/\sin(\alpha) \qquad \text{Equation 1}$$

$$e = (D/2) - H\sin(\alpha) \qquad \text{Equation 2}$$

where R is the radius of the spherical surface; D is the outer diameter of the grinder; and H is the distance between the second rotation axis and said apex; and condition (iv): With the workpiece and the grinder positioned so as to satisfy the conditions (i) to (iii), the workpiece is rotated about first axis, and the grinder is rotated about the Z-axis and simultaneously fed in the direction of the Z-axis toward the workpiece, thereby forming said predetermined target shape.

2. The method of claim 1, wherein the mechanical chuck is a retracting chuck.

3. The method of claim 2, wherein the workpiece is fitted in a support surface of a jig fixed to the spindle head, and an end portion of the workpiece protruding from the support surface and not adapted to be ground is gripped by said jaws.

4. The method of claim 3, wherein the support surface of the jig is formed by the five-axis control machining center with the jig mounted on the machining center.

5. The method of claim 1, wherein an area of the radially outer surface of the workpiece extending from its maximum diameter portion toward the ground portion is gripped by the jaws.

6. The method of claim 1, wherein clamp surfaces are formed on the jaws so as to coincide with the radially outer surface of the workpiece on the five-axis control machining center.

7. The method of claim 1, wherein another grinding portion of the workpiece is ground by the five-axis control machining center with the workpiece fixed to the spindle head.

8. The method of claim 1, wherein the finished cut surface is formed by turning of the workpiece with the cutting tool.

9. The method of claim 1, wherein the workpiece is made of hardened steel.

10. A method of manufacturing a roller including the steps of positioning a workpiece formed with a radially outer surface of a tapered roller or a convex roller, and forming an end surface of the roller having a predetermined target shape by grinding,
wherein said method comprises preparing a five-axis control machining center comprising a spindle carrying a cutting tool and a grinder, and a spindle head carrying a mechanical chuck having jaws, fixing the workpiece in position with the jaws of the mechanical chuck, cutting said end surface to a finished cut surface approximate in shape to said predetermined target shape with the cutting tool and grinding the thus cut end surface to said predetermined target shape with the grinder,
wherein an area of the radially outer surface of the workpiece extending from its maximum diameter portion toward the ground portion is gripped by the jaws, and
wherein the workpiece is formed with a center hole in the end surface of the workpiece that is not ground, and wherein the spindle head has a fixing center configured to be fitted in the center hole, thereby fixing the workpiece in position with the jaws and the fixing center.

11. The method of claim 10, wherein clamp surfaces are formed on the jaws so as to coincide with the radially outer surface of the workpiece on the five-axis control machining center.

12. The method of claim 10, wherein another grinding portion of the workpiece is ground by the five-axis control machining center with the workpiece fixed to the spindle head.

13. The method of claim 10, wherein the finished cut surface is formed by turning of the workpiece with the cutting tool.

14. The method of claim 10, wherein the workpiece is made of hardened steel.

* * * * *